US008689231B2

(12) United States Patent
Milnor

(10) Patent No.: US 8,689,231 B2
(45) Date of Patent: Apr. 1, 2014

(54) SYSTEM AND METHOD FOR ORDERING TASKS WITH COMPLEX INTERRELATIONSHIPS

(75) Inventor: Brent Milnor, Los Angeles, CA (US)

(73) Assignee: SAP AG, Waldorf (DE)

(*) Notice: Subject to any disclaimer, the term of this patent is extended or adjusted under 35 U.S.C. 154(b) by 925 days.

(21) Appl. No.: 12/494,552

(22) Filed: Jun. 30, 2009

(65) Prior Publication Data

US 2010/0333109 A1    Dec. 30, 2010

(51) Int. Cl.
| | |
|---|---|
| G06F 9/46 | (2006.01) |
| G06F 9/44 | (2006.01) |
| G06F 9/45 | (2006.01) |
| G06F 9/48 | (2006.01) |

(52) U.S. Cl.
CPC ............. *G06F 9/4881* (2013.01); *G06F 8/315* (2013.01); *G06F 8/456* (2013.01); *G06F 9/4428* (2013.01)
USPC ........... 718/106; 718/102; 717/106; 717/108; 717/109; 717/120; 717/149

(58) Field of Classification Search
USPC .......................................................... 718/106
See application file for complete search history.

(56) References Cited

U.S. PATENT DOCUMENTS

| | | | | |
|---|---|---|---|---|
| 4,949,251 A * | 8/1990 | Griffin et al. | .................... | 714/20 |
| 5,999,729 A * | 12/1999 | Tabloski et al. | ................ | 717/105 |
| 6,505,228 B1 * | 1/2003 | Schoening et al. | ........... | 718/106 |
| 7,065,634 B2 * | 6/2006 | Lewis et al. | .................... | 712/227 |
| 7,444,638 B1 * | 10/2008 | Xu | ................................ | 718/104 |
| 7,496,893 B2 * | 2/2009 | Mohindra et al. | ............ | 717/120 |
| 7,543,284 B2 * | 6/2009 | Bolton et al. | ................. | 717/157 |
| 7,584,454 B1 * | 9/2009 | Massoudi | ..................... | 717/121 |
| 7,607,120 B2 * | 10/2009 | Sanyal et al. | ................. | 717/106 |
| 7,689,410 B2 * | 3/2010 | Chang et al. | ...................... | 704/9 |
| 7,886,035 B2 * | 2/2011 | Stark | ............................. | 709/223 |
| 8,151,252 B2 * | 4/2012 | Song et al. | .................... | 717/140 |
| 8,335,862 B2 * | 12/2012 | Fletcher et al. | ............... | 709/250 |
| 2003/0120709 A1 * | 6/2003 | Pulsipher et al. | ............. | 709/106 |
| 2005/0235271 A1 * | 10/2005 | Sanyal et al. | ................. | 717/136 |
| 2007/0067201 A1 * | 3/2007 | Malewicz | ......................... | 705/9 |
| 2008/0209397 A1 * | 8/2008 | Mohindra et al. | ............ | 717/120 |
| 2009/0138686 A1 * | 5/2009 | Gruetzner et al. | ............ | 712/220 |
| 2009/0313600 A1 * | 12/2009 | Ayers et al. | .................... | 717/106 |
| 2010/0063785 A1 * | 3/2010 | Pich et al. | ......................... | 703/6 |
| 2011/0252428 A1 * | 10/2011 | Maruyama | .................... | 718/103 |
| 2012/0239911 A1 * | 9/2012 | Gonion | .......................... | 712/222 |

OTHER PUBLICATIONS

Wikipedia, "Dependency graph," retrieved on Jun. 8, 2009 from en.wikipedia.org/wiki/Dependency_graph, 3 pages.

(Continued)

*Primary Examiner* — Lewis A Bullock, Jr.
*Assistant Examiner* — Kevin X Lu
(74) *Attorney, Agent, or Firm* — Buckley, Maschoff & Talwalkar LLC

(57) ABSTRACT

One or more embodiments of the invention enable a system and method for ordering tasks with complex interrelationships. The present invention as described herein may be used to produce a linear ordering of tasks with complex interrelationships including dependencies and constraints. In one or more embodiments optional tasks may be permitted such that a given task may or may not be added to the execution queue depending on the scheduling of earlier tasks following evaluation of their dependencies—that is, the system of the invention supports the management of optional tasks in a task ordering operation where some or all of tasks have complex interdependencies.

18 Claims, 7 Drawing Sheets

(56) References Cited

OTHER PUBLICATIONS

Wkipedia, "Topological sorting," retrieved on Jun. 8, 2009 from en.wikipedia.org/wiki/Topological_sorting, 3 pages.

Wikipedia, "Transitive relation," retrieved on Jun. 8, 2009 from en.wikipedia.org/wiki/Transitive_relatin, 3 pages.

* cited by examiner ary stages of the transformation. For example, during a
SYSTEM AND METHOD FOR ORDERING TASKS WITH COMPLEX INTERRELATIONSHIPS

BACKGROUND OF THE INVENTION

1. Field of the Invention

Embodiments of the invention described herein pertain to the field of computer systems. More particularly, but not by way of limitation, one or more embodiments of the invention enable a system and method for ordering tasks with complex interrelationships.

2. Description of the Related Art

When altering the structure of a system, such as a database, care must be taken to ensure that the system retains its internal consistency and integrity at all times—even during the intermediary stages of the transformation. For example, during a transport operation (such as moving a database from a development to test environment or from a test environment to QA environment), there are several individual tasks that must be performed. Certain tasks must be scheduled execution before other tasks in order to achieve a valid result.

In classic task scheduling, a "dependency graph" may be created to identify and represent dependency relationships between tasks, and then a "topological sort" may be performed on the graph to attain an appropriate ordering of tasks with dependencies. (Information on dependency graphs and topological sort algorithms may be found at Wikipedia.com, among other sources, and are familiar to those of ordinary skill in the art of computer programming.) As with any dependency graph problem, circular dependencies must be excluded from any valid task ordering/scheduling.

As is understood by those of skill in the art, a process to order the tasks required to perform a transport operation, for example, would build a dependency graph of the tasks, and then perform a topologic sort on the tasks. The resultant ordered list of tasks may be executed to perform the transport operation while maintaining referential integrity of the database at all times. As long as the dependencies between the tasks are simple, such as "Task A must run before Task B," then this approach works satisfactorily. However, this process cannot sufficiently represent all types of dependencies, such as where a task depends on the execution of more than two other tasks. For these complex dependencies, this approach fails.

Similar requirements may arise in other contexts, such as task scheduling by operating systems, route optimization for deliveries and related problems, organizational dynamics problems, and project planning programs for schedule development. These types of contexts, among others, require a method of ordering dependent tasks, among others.

For at least the limitations described above there is a need for a system and method for ordering tasks with complex interrelationships.

BRIEF SUMMARY OF THE INVENTION

One or more embodiments of the invention enable a system and method for ordering tasks with complex interrelationships. The present invention as described herein may be used to produce a valid linear ordering of tasks that have complex interrelationships such as dependencies and constraints. In one or more embodiments, optional tasks may be permitted such that a given task may or may not be added to the execution queue depending on the scheduling of earlier tasks following evaluation of their dependencies—in other words, the system of the invention supports the management of optional tasks in a task ordering operation where some or all of tasks have complex interdependencies.

Known techniques for ensuring that dependent tasks are executed in a preferred/proper order include using a "dependency graph" and then applying a topological sort algorithm to the tasks to handle the dependencies. In another example using databases, a dependency graph may ensure that tasks to "create a new table" and "copy table X data to new table" occurs in this order, as the reverse would have that the copy task execute before the destination table had been created, causing the overall operation to fail. These tasks might, for example, be part of the move of a table from one Master Database Management (MDM) system to another. The present invention comprises an approach to achieving a valid ordering of three or more tasks that cannot be determined solely from the individual relationships of any two tasks.

In database systems, as an example, requirements to ensure the security and integrity of the system may be expressed as "business rules." To determine the legitimacy of a dependency graph when business rules are added to a list of tasks, for example ensuring that an MDM database always has at least one table at any given moment in time, the known techniques may fail. Known techniques may handle rules such as "A must come before B," but in a task list where a given task has two or more dependencies at the same time, such as "A must either come before B or C," known techniques may be unable to resolve the question of which task to perform first. While analysis methods are available to ensure no circular dependencies exist, the present invention teaches a specially programmed computer providing techniques to manage multiple dependencies in ordering tasks to execute. The present invention comprises an approach to ordering the relationships between three or more tasks using a constraint queue where those tasks that cannot be reduced to individual relationships of two tasks are properly ordered.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
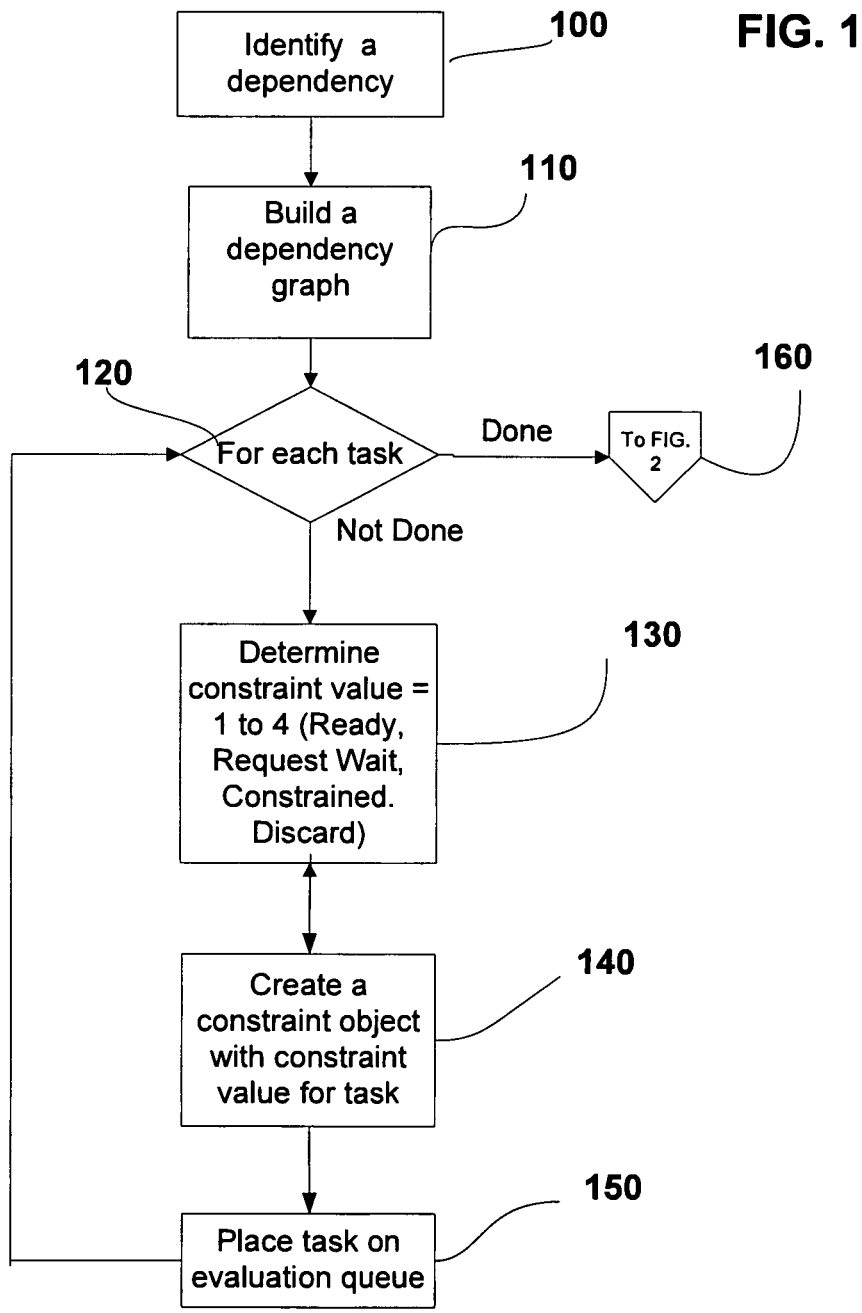
FIG. 1 illustrates an overview of a method of creating constraint values for one or more embodiments of the invention.

A system and method for ordering tasks with complex interrelationships will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Known techniques for ensuring that dependent tasks are executed in a preferred/proper order include using a "dependency graph" and then applying a topological sort algorithm to the tasks to handle the dependencies. In another example using databases, a dependency graph may ensure that tasks to "create a new table" and "copy table X data to new table" occurs in this order, as the reverse would have that the copy task execute before the destination table had been created, causing the overall operation to fail. These tasks might, for example, be part of the move of a table from one Master Database Management (MDM) system to another. The present invention comprises an approach to achieving a valid ordering of three or more tasks that cannot be determined solely from the individual relationships of any two tasks.

In any problem that involves dependencies between tasks, the dependencies may be due either to logical limitations or by other established policies. For example, in a banking application, funds are not allowed to be deposited in a non-existent account, and a customer is not allowed to withdraw funds from another customer's account. The former is a logical limitation and the second is an established policy. Collectively, these restrictions are referred to as "business rules".

To determine the legitimacy of a dependency graph when business rules are added to a list of tasks, for example ensuring that an MDM database always has at least one table at any given moment in time, the known techniques break down. Known techniques may handle rules such as "A must come before B," but in a task list where a given task has two or more dependencies at the same time, such as "A must either come before B or C," known techniques may be unable to resolve the question of which task to perform first. While analysis methods are available to ensure no circular dependencies exist, techniques to manage multiple dependencies in selecting tasks to execute to maintain an MDM are not.

In managing Master Data Management databases various business rules and other policy constraints require that certain maintenance operations occur in a particular order. The business rules of an MDM system may comprise some or all of the assumptions built into the database system by its designers and/or operators, the violations of which might cause the database to fail to function or to function improperly. Such business rules might include requiring each MDM database to have at least one table at all times, for example. However, if a MDM database is being copied, backed up, tested, updated, restored, or otherwise altered, numerous tasks/steps/commands must be executed to perform the desired operation. The change itself may require many steps to perform the required alterations. Each step/task or set of tasks may have a preferred order of execution. However, the business rules of the system may complicate the execution of the tasks to alter the structure of the MDM database. If any of these steps leaves the MDM database in a state that violates the business rules or other rules of referential integrity, even during a temporary stage in the transformation of the MDM database system, the MDM database system may be compromised.

Thus, it is critical to order the execution of the individual tasks required in order to meet not only the desired outcome of the operations, but also to ensure compliance with all business and integrity rules for the MDM database, for example.

The present invention as described herein may be used to produce a linear ordering of tasks with complex interrelationships including dependencies and constraints. In one or more embodiments optional tasks may be permitted such that a given task may or may not be added to the execution queue depending on the scheduling of earlier tasks following evaluation of their dependencies—in other words, the system of the invention supports the management of optional tasks in a task ordering operation where some or all of tasks have complex interdependencies. Queues of the invention may be implemented using any of various mechanisms understood by those of ordinary skill in the art. For example, in one or more embodiments of the invention queues may be implemented as a vector (array) indicating an order for the elements referenced in the queue.

One distinction between one or more embodiments of the invention and the prior art is that known methods for task ordering produce systems which only deal with breaking the dependencies between two tasks (such as, for example, Task A must execute before Task B), but do nothing to handle constraints on the dependencies. The present invention comprises an approach to ordering the relationships between three or more tasks that cannot be reduced to individual relationships of two tasks.

VARIOUS EXAMPLES

In one or more embodiments, for example a database system subject to the processes of the invention may have a business rule that a repository must always have at least one "Main Table" object. During a "transport" operation, for example, copying a database repository from one environment to another, the repository may start with Main Tables "A," "B," and "C" that all must be deleted for the old target database and new Main Tables "X," "Y," and "Z" must be added to the target database in their place. The business rule in this example may be interpreted as, "not all Main Tables may be deleted before at least one new Main Table is added."

In addition or in another embodiment, an exemplary database system may have a business rule that states two fields may not have the same name at the same time in the same repository, for example. Subject to processes of the prior art under such a rule, for example, if a Field A0 is to be deleted and a new field "Field A1" is to be added, adding a simple dependency rule such as "deleting Field A0 must occur before Adding Field A1" would be sufficient to ensure maintaining integrity of the database system in question. Unfortunately in practice using this known approach may create circular dependencies, which in most systems will invalidate the dependency graph. Hereinafter, a circular dependency occurs when a dependency graph becomes invalid due to conflicting interdependencies between tasks. In the case where a circular dependency might be created, a new step—"Assign Field A0 a temporary name" may be added to resolve the circular dependency.

A more complex example, however, may comprise:
If possible, perform "Delete Field A0" before "Add Field A1".
Else, perform "Assign Field A0 a temporary name", "Add Field A1", and then "Delete Field A0". In this case, one of the later tasks, "Assign Field A0 a temporary name," will become obsolete (moot) if the preferred task order may be performed.

According to the dependency resolution process of the invention, an enhanced "dependency graph" model may be created to provide management and visibility to the notion of "dependency constraints." Dependency constraints ("constraints") may be used to add new requirements, creating tasks with complex interrelationships for task scheduling that may not lend itself to representation in classic dependency graph.

The traditional "topological sort" process that may occur after the task dependencies are resolved must also be enhanced in the invention to honor tasks with dependency constraints caused by complex interrelationships.

FIG. 1 illustrates a loop counter for processing tasks in one or more embodiments of the invention that may be used to implement a method of creating constraint values for one or more embodiments of the invention. The process generates dependencies and constraints, and performs a constraint resolution process to produce an ordered list of tasks. First, at step 100, a dependency among two tasks is identified and recorded. Identified dependencies are recorded, for example, in a dependency graph at step 110, for example. In one or more embodiments of the invention at step 120, a program implementing an embodiment may perform evaluation of the tasks to be performed and determine, as step 130, the appropriate constraint for any task requiring a constraint relative to the other tasks to be preformed is determined. Example constraints may include a limited list such as, for example:

Ready: The task is ready to be executed;
Request Wait: The task may be executed, but it is not yet an optimum time;
Constrained: The task may not be executed yet. Other tasks must be performed first; and
Discard: Other tasks have executed making this task no longer necessary.

Following the determination of each possible constraint, the system described herein may then create a constraint object (as in object oriented programming or OOP) to hold the constraint condition and provide storage for other data and methods required to manage, execute and delete constraints. The constraint values for each task to execute may be stored in the constraint object at step 140. As task constraints are determined the tasks are placed on a queue for further evaluation at step 150. The process may loop to complete the constraint evaluation for each task to be executed. Processing may repeat for each task at step 120. When all tasks have been evaluated, processing may proceed as illustrated in FIG. 2 via connector 160.

Figure 2:
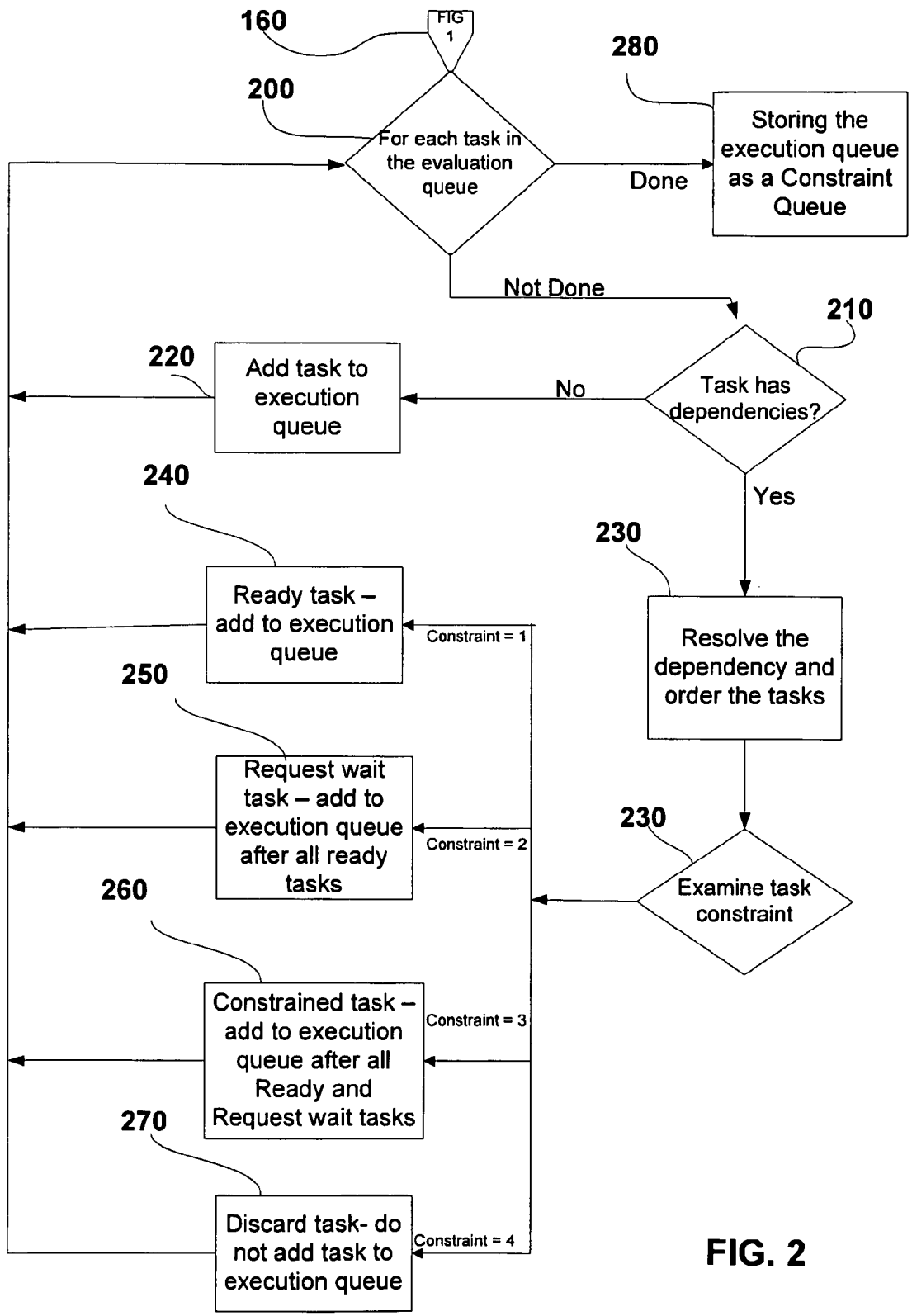
FIG. 2 illustrates an overview of a method of processing constraint values for one or more embodiments of the invention.

FIG. 2 illustrates an overview of a method of processing constraint values for one or more embodiments of the invention such that constrained tasks may be added to the execution queue when appropriate. Once a task has had all of its normal dependencies resolved, as illustrated in FIG. 1 and represented via connector 160, its constraint object may then be queried and the constraint value used to determine final placement of tasks on the execution queue. Dependencies may be resolved using any of a group of methods known to those of ordinary skill in the art. For example, one or more embodiments may resolve dependencies by displaying a list of dependencies to a user in a user interface, where suggested resolutions are presented based on inferences drawn automatically and presented to a user through a user interface where the user may accept the proposed resolution or override the proposed resolution with another selection.

As exemplified above, constraint objects may return one of four conditions in one or more embodiments of the invention: One or more embodiments may perform a modified topological-type sort that selects constrained tasks best able to be executed to move earlier into the execution queue. At step 200 each task is processed in turn. Where a task has no dependencies (for example at step 210) that task may be added to the execution queue immediately at step 220. Where a task has dependencies the dependencies must be resolved using methods of resolving the dependencies described elsewhere herein and understood by those of ordinary skill in the art. When the dependencies are resolved, at step 230, the tasks are ordered and the constraint object examined to determine the constraint value. In one or more embodiments, the constraint value may be one of four values detailed elsewhere herein. Where the constraint is "Ready" the task may be added immediately to the execution queue respecting only its dependencies, as represented at step 240. If the constraint returns "Request Wait" that task may be added after tasks whose constraint status is "Ready," as shown at step 250. Where the constraint returns a "Constrained," that task may wait (follow in the execution queue) until after all "Ready" and "Request Wait" tasks have been executed, as represented by step 260. Finally, if a constraint status is "Discard" the task may be left off the execution queue entirely, as shown at step 270. Whatever the constraint status, each task is evaluated in turn at step 200. When all tasks are evaluated and appropriate tasks placed on the execution queue, the resulting queue may be considered a "constraint queue" in the manner of the invention, as shown at step 280.

EXAMPLES

Figure 3:
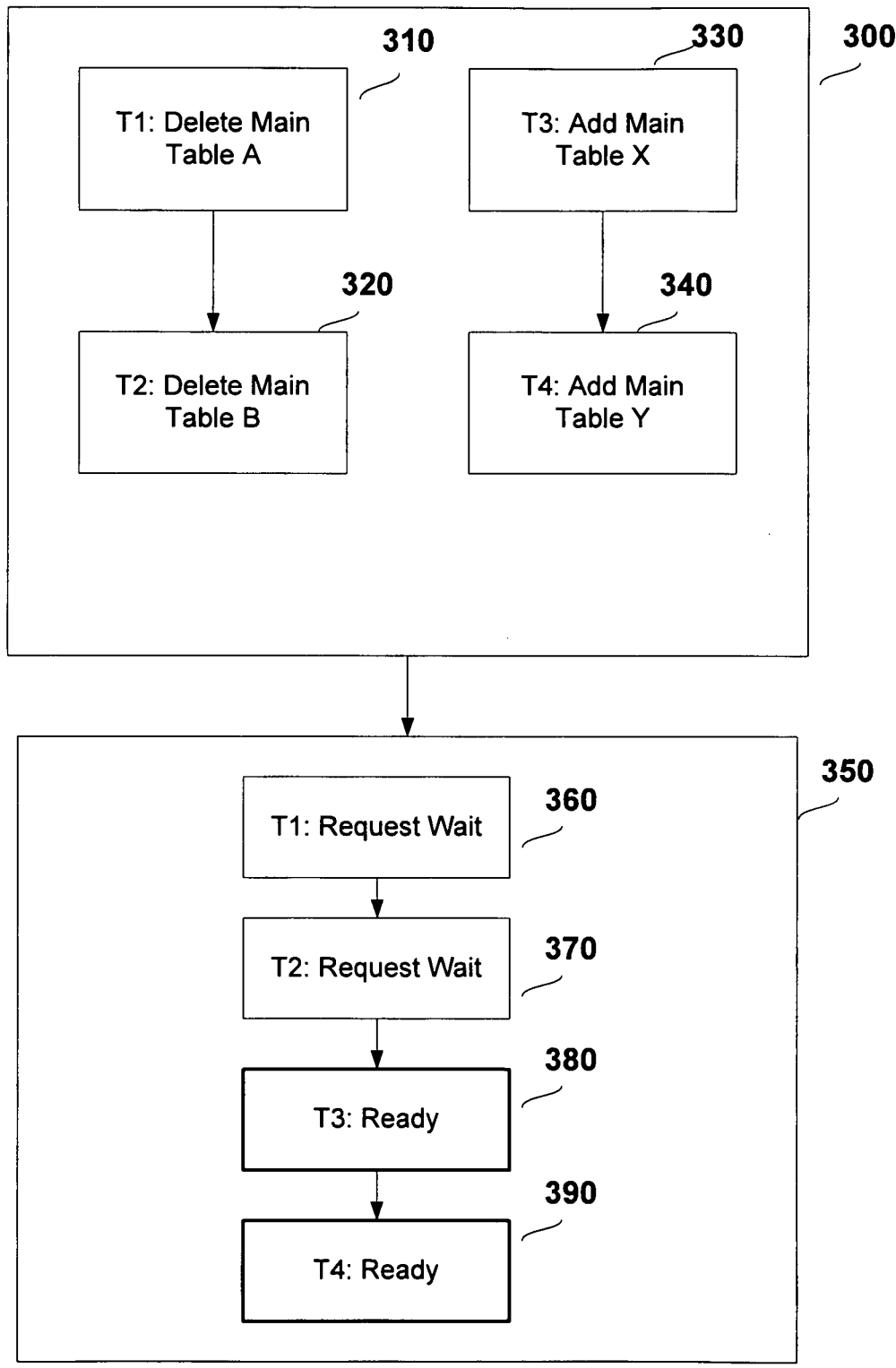
FIG. 3 illustrates the preliminary evaluation of tasks required to delete two tables and add two replacement tables to a Master Database Management System.

FIG. 3 illustrates an example of the processing of dependency constraints to order tasks with complex interrelationships. This, and other examples provided herein, help illustrate how using dependency constraints provides advancement in the art of scheduling tasks with complex interrelationships. Keep in mind, the tasks shown would typically be in an environment where there are potentially thousands of other tasks in the traditional dependency graph.

Example 1

Example 1 proposes the following tasks to accomplish the substitution of two main tables in a Master Database Management (MDM) system. The business rules of such a system, as in this example, require that the MDM system always contain at least one Main Table. Thus, to delete both main table and then create two new main tables would leave the system, at least temporarily, in a state of having no main tables. This state would violate the business rule and result in an invalid database. Thus, a solution that acknowledges the dependency of the business rule as to table deletion is needed. In one or more embodiments, a process for producing the desired result might begin by evaluating the following task list for constraints, as illustrated in evaluation 300 of FIG. 3. Tasks as follows represent the operations required to replace table A and B with tables X and Y, where Task 1 is represented at T1, Task 2 as T2, and so on.

T1. Delete Main Table A 310;
T2. Delete Main Table B 320;
T3. Add Main Table X 330; and
T4. Add Main Table Y 340.

If none of the tasks had other dependencies, the constraint objects would return:

T1: Request Wait 360
T2: Request Wait 370
T3: Ready 380
T4: Ready 390

If T3 were then executed, the constraint would then return "Ready" for all the remaining tasks.

Example 2

Suppose we had the same tasks and circumstances, but T3 and T4 were blocked by other dependencies.

Figure 4:
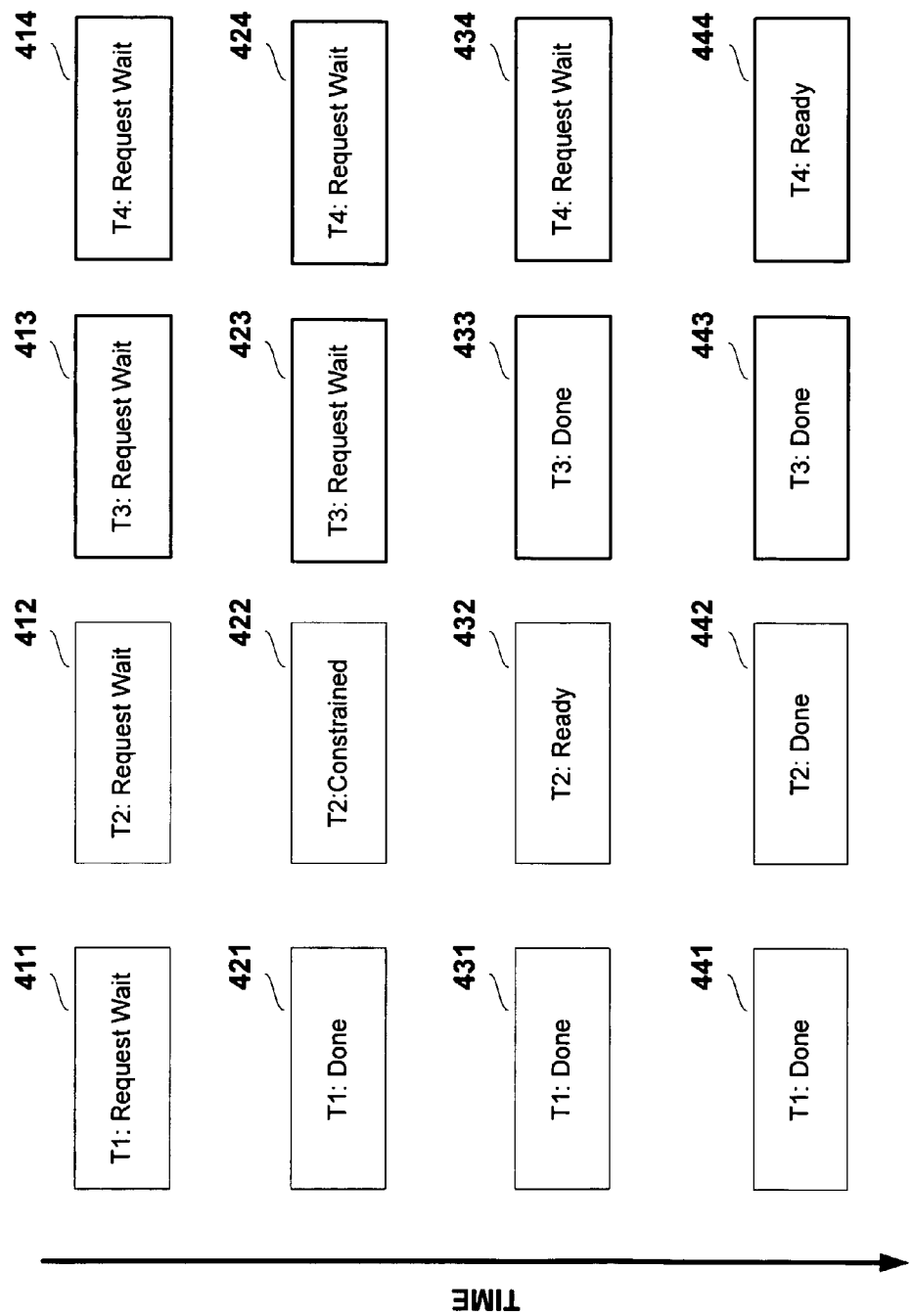
FIG. 4 illustrates an exemplary processing of tasks constrained by complex interrelationships.

FIG. 4 illustrates an exemplary processing of tasks constrained by complex interrelationships over time when operated on by the processes and invention described herein. As shown in FIG. 4, blocks 411-414 represent the constraint status of tasks T1-T4 at a given time. In this example, the constraint would return "Request Wait" for both T1 at 411 and T2 at 412. It may be there are no other Ready tasks, so T1 is executed (and shows a status of "Done" at 421.) At the next time line, following that, the constraints would return "Constrained" for T2 at 422, since executing it would violate business logic and T3 and T4 would remain "Request Wait" at 423 and 424. As T3 has the highest priority constraint (and proceeds T4), task T3 would execute next (as show in the next time line at 433.) Now that T3 has executed, task T2 may be unconstrained, and its status is revised to "Ready" at 432. In the next time line Task T2 is executed (at block 442) as it is a higher priority task than T4, and its status is "Ready." The execution of T2 may have freed the constraint on T4 at 444, and so that task becomes "Ready." Task T4 will then be performed, completing the task sequence.

Example 3

Figure 5:
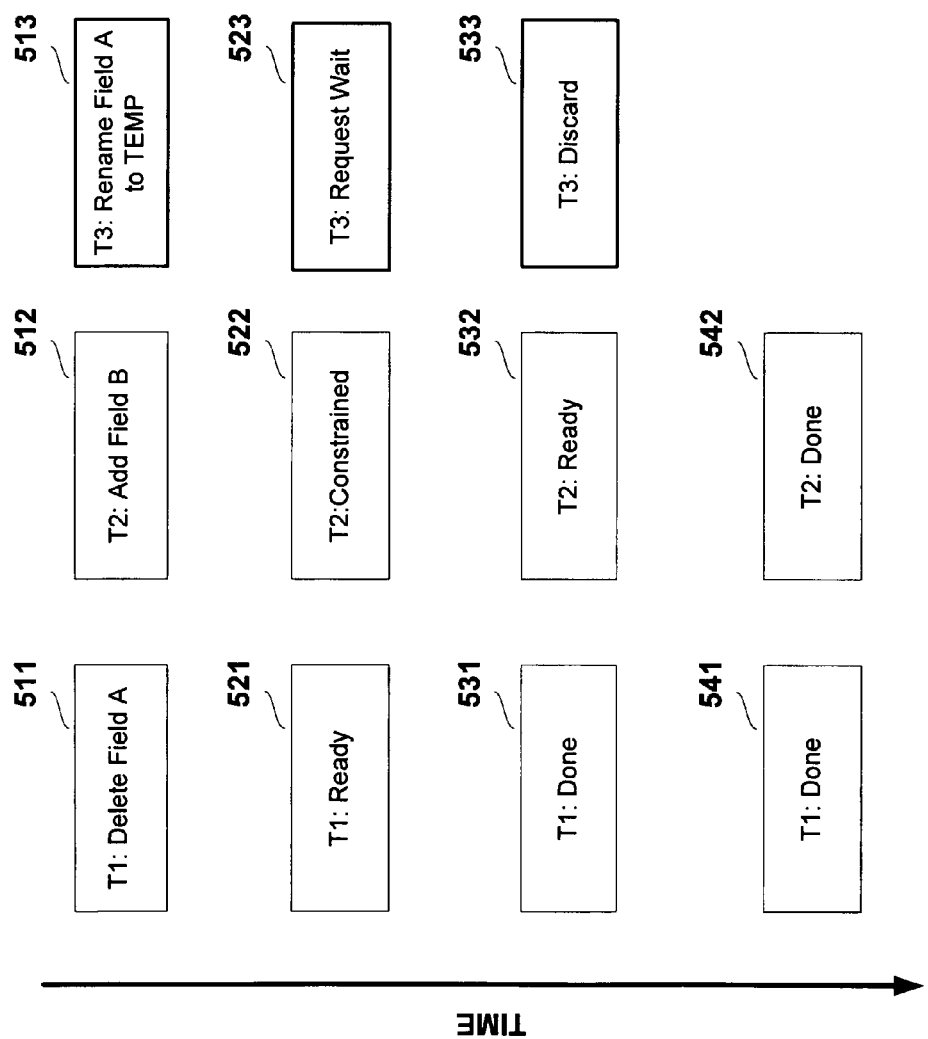
FIG. 5 illustrates an exemplary processing of tasks constraints associated with processing optional tasks to resolve a dependency.

In this example a process is described for managing the deletion of a field A from a table of a Master Database Management system, followed by the addition of a different field B to the table:

FIG. 5 illustrates an exemplary processing of tasks constraints associated with processing optional tasks to resolve a dependency.

T1: Delete Field A 511
T2: Add new Field B 512
T3: Rename the Field A to TEMP 513
In this case, the Constraint object for each task may return:
T1: Ready 521
T2: Constrained (add cannot happen before delete or rename) 522
T3: Request Wait (it would be preferred to execute the delete instead of rename) 523

In this example, the enhanced "Topological Sort" sequence of the invention would produce an instruction to next execute task T1 at 531. At point 523, T3 changes form Request Wait at 523 to Discard at 533 as Task 1 is Done.

Following the execution of task T1, the constraint evaluation would return:
T2: Ready 532
T3: Discard. 533

In this example, task T3, a "contingency case" task, would not be needed because T1 had already executed.

Figure 6:
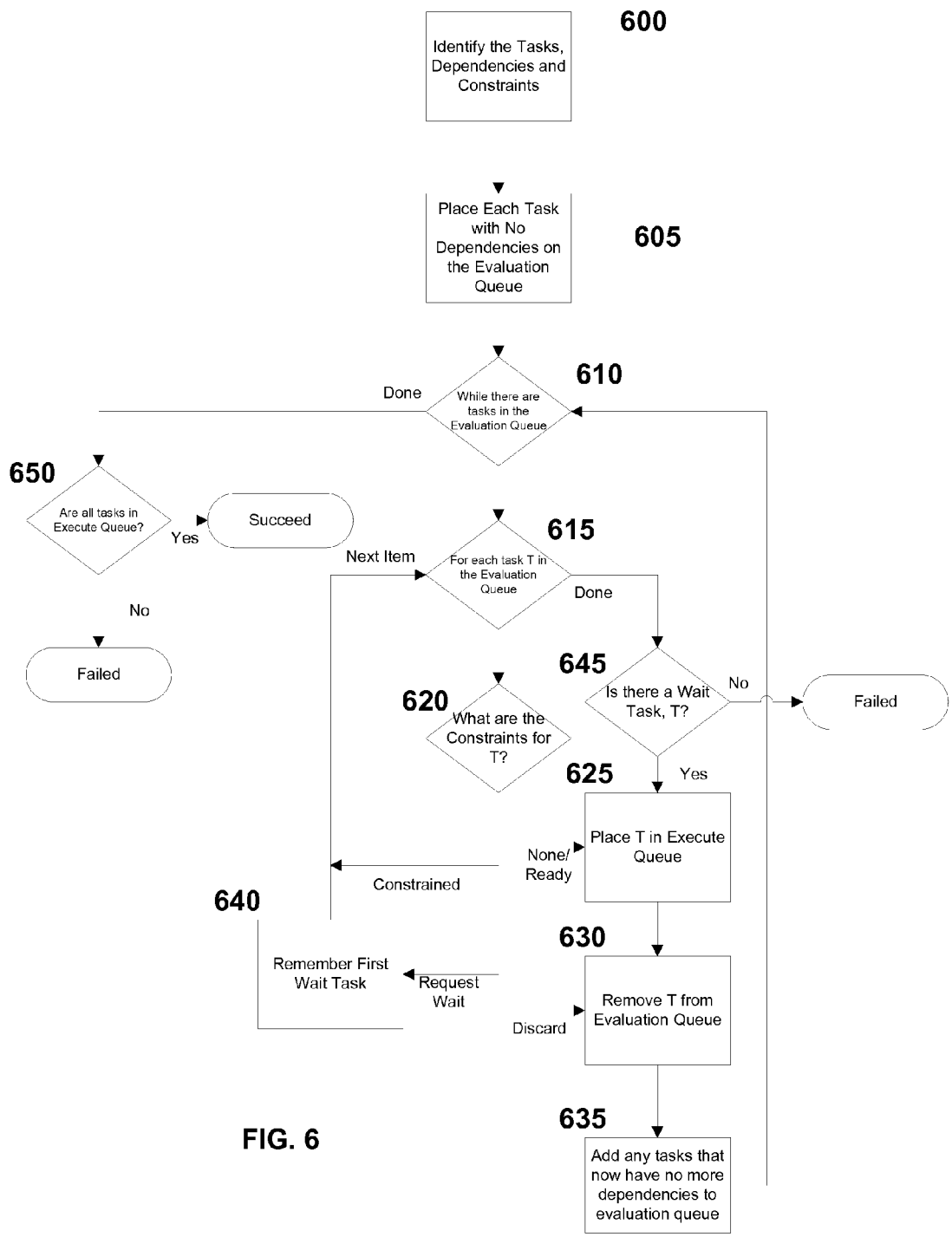
FIG. 6 illustrates an exemplary flow chart of a method of performing the invention in one or more embodiments.

FIG. 6 illustrates an exemplary flow chart of a method of performing the invention in one or more embodiments. In step 600, the individual tasks along with their dependencies and constraints may be determined. This step may be unique to each specific problem. At step 605, the tasks that are not dependent on any other tasks, but may have Constraints, may be added to an evaluation queue. The main loop is at step 610, which should continue until no more items are left to process.

A sub-loop may be made at step 615 to attempt to identify a task to be processed. The Constraints for task may be examined in step 620. If there are no Constraints, or the Constraints determine the task is "Ready," then the task may be placed in the execute queue, the task removed from the evaluation queue, and any tasks that no longer have any dependencies may be added to the evaluation queue, as shown in steps 625, 630, and 635. If the Constraint is "Discard," then the task may not added to the execution queue but steps 630 and 635 may still be executed. If the Constraint is "Request Wait," the task may be remembered at step 640, in case there is nothing else that may be processed immediately. If the constraint is "Constrained", the task may be left unprocessed in the evaluation queue.

The sub-loop at step 615 may complete when an item is processed. If no item was processed, but there was at least one queued item with a "Request Wait" constraint, that item may be processed, at step 645. If there were no such items, indicating all the queued items are "Constrained," then the process fails. Failure indicates that there is no linear ordering of tasks that meets the criteria.

The main loop may terminate when there are no items left in the evaluation queue. A check may be made at step 650 to ensure all tasks have been processed. If some tasks did not make it to the execute queue, then there was a circular dependency that could not be resolved.

Computer System Architecture

The method described here is not limited as to the type of computer it may run upon and may for instance operate on any generalized computer system that has the computational ability to execute the methods described herein and can display the results of the users choices on a display means. The computer typically includes at least a keyboard, a display device such as a monitor, and a pointing device such as a mouse. The computer also typically comprises a random access memory, a read only memory, a central processing unit and a storage device such as a hard disk drive. In some embodiments of the interface, the computer may also comprise a network connection that allows the computer to send and receive data through a computer network such as the Internet. Mobile computer platforms such as cellular telephones, smart phone, Personal Desktop Assistants (PDAs), kiosks, set top boxes, games boxes or any other computational device, portable, personal or otherwise, may also qualify as a computer system capable of executing the methods described herein.

In various embodiments, the present invention may be implemented as a method, apparatus, or article of manufacture using standard "programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus, the article of manufacture also comprises the medium in which the code is embedded. Those skilled in the art will recognize that many modifications may be made to this configuration without departing from the scope of the present invention.

Embodiments of the system to order tasks with complex interrelationships may be embodied in software that may execute on one or more computers having a computer usable memory medium (or a computer readable memory medium) and computer readable program code. The computer readable program code may include an input function, to acquire task relationships. The various ordering functions are configured to handle task constraints as described elsewhere herein.

Furthermore, embodiments of the present invention may be implemented as a program of computer-readable instructions and/or computer-readable data stored on a computer-readable medium. Programs, data and other information may constitute, but are not limited to, sets of computer instructions, code sequences, configuration information, and other information in any form, format or language usable by a general purpose computer or other processing device, such that when such a computer contains, is programmed with, or has access to said programs, data and other information said general purpose computer is transformed into a machine capable of ordering tasks with complex interrelationships, such as those described above. A computer-readable medium suitable to provide computer readable instructions and/or computer readable data for the methods and processes described herein may be any type of magnetic, optical, or electrical storage medium including a disk, tape, CD, DVD, flash drive, thumb drive, storage card, or any other memory device or other storage medium known to those of skill in the art.

In one or more embodiments of the invention, the methods described here may not be limited as to the type of computer it may run upon and may for instance operate on any generalized computer system that has the computational ability to execute the methods described herein and can display the results of the user's choices on one or more display devices. Display devices appropriate for providing interaction with the invention described herein includes, but is not limited to, computer monitors, cell phones, PDAs, televisions, or any other form of computer controllable output display. As used herein, a computer system refers to but is not limited to any type of computing device, including its associated computer software, data, peripheral devices, communications equipment and any required or desired computers that may achieve direct or indirect communication with a primary computing device.

In one or more embodiments of the invention, a general-purpose computer may be utilized to implement one or more aspects of the invention. In one or more embodiments of the invention, the computer may include various input and output means, including but not limited to a keyboard or other textual input devices, a display device such as a monitor or other display screen, and a pointing device and/or user selection indicator such as a mouse, keypad, touch screen, pointing device, or other known input/output devices known to those of skill in the art. The general-purpose computer described herein may include one or more banks of random access memory, read only memory, and one or more central processing unit(s). The general-purpose computer described herein may also include one or more data storage device(s) such as a hard disk drive, or other computer readable medium discussed above. An operating system that executes within the computer memory may provide an interface between the hardware and software. The operating system may be responsible for managing, coordinating and sharing of the limited resources within the computer. Software programs that run on the computer may be performed by an operating system to provide the task ordering function of the invention with access to the resources needed to execute. In other embodiments the task ordering function may run stand-alone on the processor to perform the methods described herein.

In one or more embodiments of the invention, the method(s) described herein, when loaded on or executing through or by one or more general purpose computer(s) described above, may transform the general-purpose computer(s) into a specially programmed computer able to perform the method or methods described herein. In one or more embodiments of the invention, the computer-readable storage medium(s) encoded with computer program instructions that, when accessed by a computer, may cause the computer to load the task ordering program instructions to a memory there accessible, thereby creates a specially programmed computer able to perform the methods described herein as a specially programmed computer.

The specially programmed computer of the invention may also comprise a connection that allows the computer to send and/or receive data through a computer network such as the Internet or other communication network. Mobile computer platforms such as cellular telephones, Personal Desktop Assistants (PDAs), other hand-held computing devices, digital recorders, wearable computing devices, kiosks, set top boxes, games boxes or any other computational device, portable, personal, real or virtual or otherwise, may also qualify as a computer system or part of a computer system capable of executing the methods described herein as a specially programmed computer.

Figure 7:
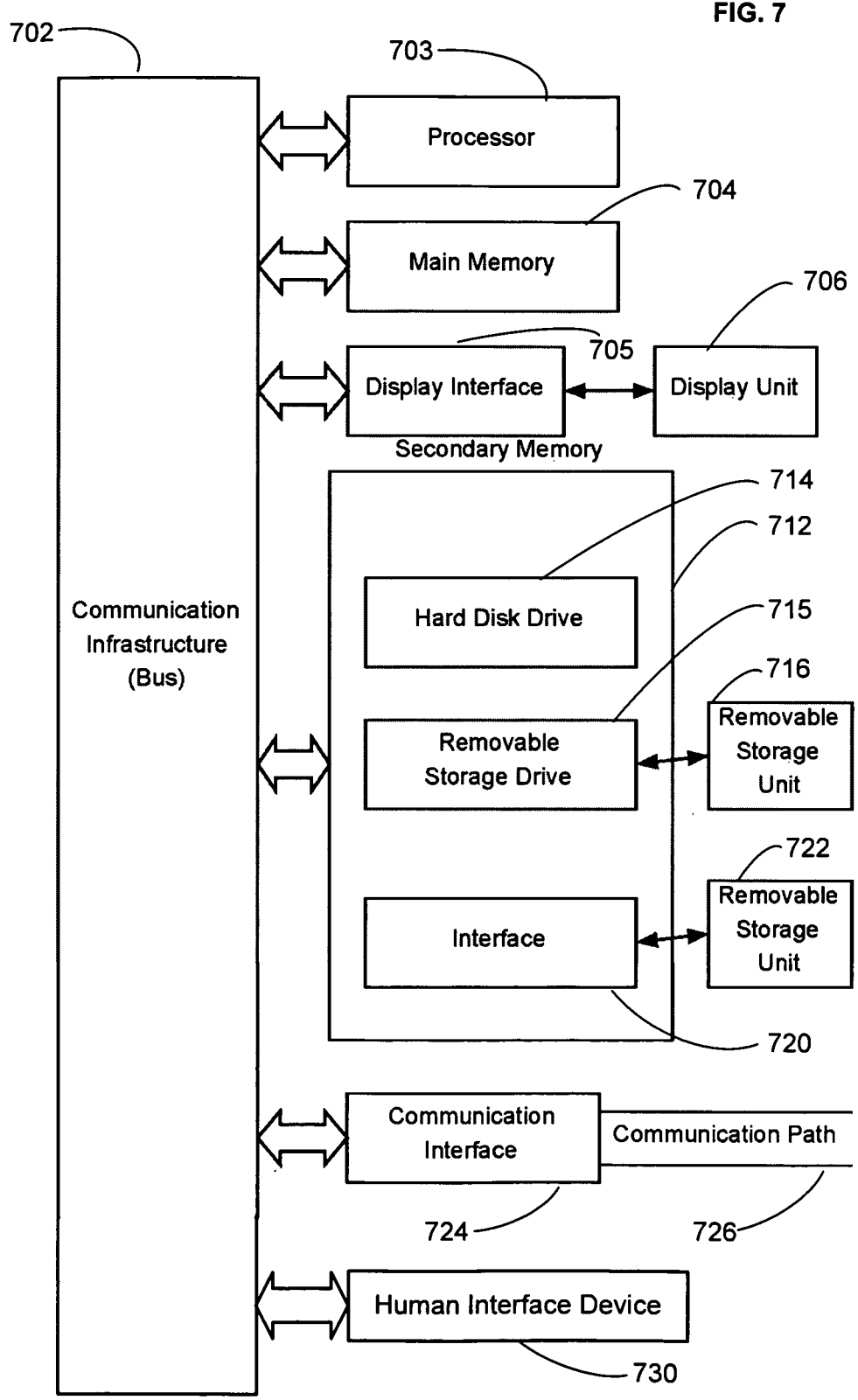
FIG. 7 illustrates a general-purpose computer and peripherals that when programmed as described herein may operate as a specially programmed computer capable of implementing one or more methods, apparatus and/or systems of the invention.

FIG. 7 depicts a general-purpose computer and peripherals, when programmed as described herein, may operate as a specially programmed computer capable of implementing one or more methods, apparatus and/or systems of the invention. Processor 707 may be coupled to bi-directional communication infrastructure 702 such as Communication Infrastructure System Bus 702. Communication Infrastructure 702 may generally be a system bus that provides an interface to the other components in the general-purpose computer system such as Processor 707, Main Memory 706, Display Interface 708, Secondary Memory 712 and/or Communication Interface 724.

Main memory 706 may provide a computer readable medium for accessing and executed stored data and applications. Display Interface 708 may communicate with Display Unit 710 that may be utilized to display outputs to the user of the specially programmed computer system. Display Unit 710 may comprise one or more monitors that may visually depict aspects of the computer program to the user. Main Memory 706 and Display Interface 708 may be coupled to Communication Infrastructure 702, which may serve as the interface point to Secondary Memory 712 and Communication Interface 724. Secondary Memory 712 may provide additional memory resources beyond main Memory 706, and may generally function as a storage location for computer programs to be executed by Processor 707. Either fixed or removable computer-readable media may serve as Secondary Memory 712. Secondary Memory 712 may comprise, for example, Hard Disk 714 and Removable Storage Drive 716 that may have an associated Removable Storage Unit 718. There may be multiple sources of Secondary Memory 712 and systems of the invention may be configured as needed to support the data storage requirements of the user and the methods described herein. Secondary Memory 712 may also comprise Interface 720 that serves as an interface point to additional storage such as Removable Storage Unit 722. Numerous types of data storage devices may serve as repositories for data utilized by the specially programmed computer system of the invention. For example, magnetic, optical or magnetic-optical storage systems, or any other available mass storage technology that provides a repository for digital information may be used.

Communication Interface 724 may be coupled to Communication Infrastructure 702 and may serve as a conduit for data destined for or received from Communication Path 726. A Network Interface Card (NIC) is an example of the type of device that once coupled to Communication Infrastructure 702 may provide a mechanism for transporting data to Communication Path 726. Computer networks such Local Area Networks (LAN), Wide Area Networks (WAN), Wireless networks, optical networks, distributed networks, the Internet or any combination thereof are some examples of the type of communication paths that may be utilized by the specially program computer system of the invention. Communication Path 726 may comprise any type of telecommunication network or interconnection fabric that can transport data to and from Communication Interface 724.

To facilitate user interaction with the specially programmed computer system of the invention, one or more Human Interface Devices (HID) 730 may be provided. Some examples of HIDs that enable users to input commands or data to the specially programmed computer of the invention may comprise a keyboard, mouse, touch screen devices, microphones or other audio interface devices, motion sensors or the like, as well as any other device able to accept any kind of human input and in turn communicate that input to Processor 707 to trigger one or more responses from the specially programmed computer of the invention are within the scope of the system of the invention.

While FIG. 7 depicts a physical device, the scope of the system of the invention may also encompass a virtual device, virtual machine or simulator embodied in one or more computer programs executing on a computer or computer system and acting or providing a computer system environment compatible with the methods and processes of the invention. Where a virtual machine, process, device or otherwise performs substantially similarly to that of a physical computer system of the invention, such a virtual platform will also fall within the scope of a system of the invention, notwithstanding the description herein of a physical system such as that in FIG. 7.

One or more embodiments of the invention are configured to enable the specially programmed computer of the invention to order tasks with complex interrelationships by applying one or more of the methods and/or processes of the invention as described herein. Thus the methods described herein are able to produce an ordered list of tasks that resolves task dependencies and contingencies using the specially programmed computer as described herein.

While the invention herein disclosed has been described by means of specific embodiments and applications thereof, numerous modifications and variations could be made thereto by those skilled in the art without departing from the scope of the invention set forth in the claims. The foregoing description is therefore considered in all respects to be illustrative and not restrictive. The scope of the invention is indicated by the appended claims, and all changes that come within the meaning and range of equivalents thereof are intended to be embraced therein.

What is claimed is:

1. A system comprising:
   a processor; and
   a computer-readable medium comprising computer-readable instructions to perform an automated process, said automated process comprising:
   obtaining an ordered list of tasks, each task of said ordered list of tasks further comprising two or more task dependencies associated with said each task;
   determining a ready constraint to indicate that a task is ready for execution for a first task of said ordered list of tasks and adding said first task to an evaluation queue;
   determining a request wait constraint to indicate that a task may be executed but it is not yet an optimal time for a second task of said ordered list of tasks and adding said second task to the evaluation queue;
   determining a constrained constraint to indicate that a task may not be executed until other tasks must be performed first for a third task of said ordered list of tasks and adding said third task to the evaluation queue; and
   creating an object oriented constraint object for each determined constraint associated with a task of the ordered list of tasks , the creating comprising:
   inserting the determined constraint, and the methods for managing, executing and deleting constraints to determine constrained tasks best able to be executed;
   processing said evaluation queue by:
   adding the first task to an execution queue based on a first determination by a respective object oriented constraint object associated with the first task;
   adding the second task to the execution queue after the first task based on a second determination by a respective object oriented constraint object associated with the second task; and
   adding the third task to the execution queue wherein the third task is not executed until the first and second tasks are performed first based on a third determination by a respective object oriented constraint object of the third task.

2. The system of claim 1 further comprising: determining a discard constraint based on the task dependencies for a fourth task of said ordered list of tasks and adding said fourth task to the evaluation queue; and processing said evaluation queue by not adding said fourth task to the execution queue.

3. The system of claim 1 further comprising a database coupled to said computer and wherein said ordered list of tasks further comprise tasks to perform alterations to said database.

4. The system of claim 3 wherein said database is a Master Database Management system.

5. The system of claim 2 further comprising removing said each task from said evaluation queue when said constraint for said each task is discard.

6. The system of claim 2 further comprising adding said each task from said evaluation queue to said execution queue when said constraint for said each task is request wait and no tasks on said evaluation queue are ready.

7. The system of claim 2 further comprising adding said each task from said evaluation queue to said execution queue when said constraint for said each task is constrained only when all ready and request wait tasks have been previously removed from said evaluation queue.

8. A system comprising:
   a processor; and
   a computer-readable medium comprising computer-readable instructions to perform an automated process, said automated process comprising the steps of:
   obtaining an ordered list of tasks, each task of said ordered list of tasks further comprising task dependencies associated with said each task;
   determining a ready constraint to indicate that a task is ready for execution for a first task of said ordered list of tasks and adding said first task to an evaluation queue;
   determining a request wait constraint to indicate that a task may be executed but it is not yet an optimal time for a second task of said ordered list of tasks and adding said second task to the evaluation queue;
   determining a constrained constraint to indicate that a task may not be executed until other tasks must be performed first for a third task of said ordered list of tasks and adding said third task to the evaluation queue; and creating an object oriented constraint object for each determined constraint associated with a task of the ordered list of tasks, the creating comprising:

inserting the determined constraints, and methods for managing, executing and deleting constraints to determine constrained tasks best able to be executed;

processing said evaluation queue, said processing comprising:

adding the first task to an execution queue based on a first determination by a respective object oriented constraint object associated with the first task;

adding the second task to the execution queue after the first task based on a second determination by a respective object oriented constraint object associated with the second task; and adding the third task to the execution queue wherein the third task is not executed until the first and the second tasks are performed first based on a third determination by a respective object oriented constraint object of the third task.

9. The system of claim 8 further comprising said constraint value selected from a group consisting of: ready, request wait, constrained and discard, wherein a constrained task is not executed until other tasks are performed first.

10. The system of claim 8 further comprising a database coupled to said computer and wherein said ordered list of tasks further comprise tasks to perform alterations to said database.

11. The system of claim 10 wherein said database is a Master Database Management system.

12. The system of claim 8 further comprising removing said each task from said evaluation queue when said constraint value for said each task is discard.

13. The system of claim 8 further comprising adding said each task from said evaluation queue to said execution queue when said constraint value for said each task is request wait and no tasks on said evaluation queue are ready.

14. The system of claim 8 further comprising adding said each task from said evaluation queue to said execution queue when said constraint value for said each task is constrained only when all ready and request wait tasks have been previously removed from said evaluation queue.

15. A non-transitory computer-readable medium comprising computer-readable instructions to perform an automated process, said automated process comprising:

obtaining an ordered list of tasks, each task of said ordered list of tasks further comprising two or more task dependencies associated with said task;

determining a ready constraint to indicate that a task is ready for execution for a first task of said ordered list of tasks and adding said first task to an evaluation queue determining a request wait constraint to indicate that a task may be executed but it is not yet an optimal time for a second task of said ordered list of tasks and adding said second task to the evaluation queue;

determining a constrained constraint to indicate that a task may not be executed until other tasks must be performed first for a third task of said ordered list of tasks and adding said third task to the evaluation queue; and creating an object oriented constraint object for each determined constraint associated with a task of said ordered list of tasks, the creating comprising:

inserting the determined constraints, and methods for managing, executing and deleting constraints to determine constrained tasks best able to be executed;

processing said evaluation queue by:

adding the first task to an execution queue based on a first determination by a respective object oriented constraint object associated with the first task;

adding the second task to the execution queue after the first task based on a second determination by a respective object oriented constraint object associated with the second task; and adding the third task to the execution queue wherein the third task is not executed until the first and the second tasks are performed first based on a third determination by a respective object oriented constraint object of the third task.

16. The system of claim 1, wherein the object oriented constraint object comprises methods to manage, execute, and delete constraints.

17. The system of claim 8, wherein the object oriented constraint object comprises methods to manage, execute, and delete constraints.

18. The medium of claim 15, wherein the object oriented constraint object comprises methods to manage, execute, and delete constraints.

* * * * *